Patented Dec. 16, 1947

2,432,850

UNITED STATES PATENT OFFICE 2,432,850

WATER-SOLUBLE CONDENSATION PRODUCTS AND PROCESS OF MAKING SAME

Otto Albrecht, Neue Welt, near Basel, Switzerland, assignor to Society of Chemical Industry in Basle, Basel, Switzerland No Drawing. Application May 19, 1942, Serial No. 443,662. In Switzerland May 2, 1941

20 Claims. (Cl. 260—401)

It has been found that new, water-soluble condensation products are obtained if organic compounds having at least two carbon atoms and in which at least one hydrogen atom is linked to a nitrogen atom of an, at most, weakly basic amino group or to a nuclear carbon atom of a hydroxyaryl radical which is free from strongly basic amino groups are condensed with salts of aldehyde- or ketosulfoxylic acids, if desired, in the presence of substances which accelerate the reaction. Products which contain at most a weak basic amino group are, of course, free from strong basic amino groups which, as is well known, would also react with salts of aldehyde sulfoxylic acids.

As organic compounds, in which at least one hydrogen atom is linked to a nitrogen atom of an amino group, which is, at most, only weakly basic in character, use is preferably made in the present process of amides, such as primary sulfonic acid amides, primary carboxylic acid amides, urethanes, or their N-monosubstituted products, also of substituted ureas. Among these compounds may be mentioned, for example, aliphatic or aromatic sulfonic acid amides, such as benzene sulfamide, toluene or cymene sulfamides; monosubstituted sulfonic acid amides, such as para-stearoylaminotoluene sulfamide, cymene sulfamides which are monosubstituted at the nitrogen atom by the radical of cocoanut fatty acid; primary aliphatic carboxylic acid amides (which should preferably contain at least 8 carbon atoms); further, aromatic, aliphatic-aromatic or cycloaliphatic carboxylic acid amides, such as acetic, lauric, palmitic, stearic, oleic acid amides, the amide of whale oil fatty acids, chloracetic, ricinoleic, benzoic, para-lauroylamino-benzoic acid amides; furthermore, the amides of resinic or naphthenic acids. Carboxylic acid monoamides of semi-esters of dicarboxylic acids, such as esters of maleic or phthalamidic acids, also come into consideration.

As urethanes, for example, carboxylic acid esters of aliphatic alcohols of high molecular weight, and as substituted ureas alkyl ureas may be used.

As organic compounds, in which at least one hydrogen atom is united to a nuclear carbon atom of a hydroxyaryl radical which is free from strongly basic amino groups, i. e., primary, secondary or tertiary amino groups, use may be made, for example, of phenol, cresols, xylenols, iso-propyl phenols, preferably, however, of hydroxyphenyl compounds which contain an aliphatic radical of at least 8 carbon atoms in the ortho or para position to the hydroxyl group, such as heptadecyl-(para-hydroxyphenyl)-ketone.

As salts of aldehyde or ketone sulfoxylic acids, use is preferably made of salts of formaldehyde sulfoxylic acid, which, as is known, is also designated as hydroxymethane sulfinic acid. For the purposes of the reaction, it is advisable to use the primary alkali salts, that is, the salts which are free from water of crystallization or hydrates, for example, the dihydrate of sodium formaldehyde sulfoxylate. However, salts of acetaldehyde, benzaldehyde or acetone sulfoxylic acids may also come into consideration.

The reaction of the parent materials of the present invention with the salts of aldehyde or ketone sulfoxylic acids preferably takes place at raised temperatures, if desired, in the presence of substances which accelerate the reaction, such as zinc chloride or secondary amines, for example, under addition of diamylamine. The temperature of reaction is dependent on the nature of the parent materials used. Primary sulfonic acid amides already react in many cases at 100–120° C. In the case of the carboxylic acid amides or hydroxyaryl compounds mentioned, however, it is generally necessary to raise the temperature still further, for instance to 140–180° C. During the reaction, solvents or diluents of high boiling point or finely divided solid substances which promote transference of heat, for example, salts, may be present in the reaction mixture. It is also possible to work under reduced pressure or under continuous distillation of any solvent or diluent which may have been added to the reaction mixture.

The exact constitution of the products of the invention is not known. There is no doubt, however, that an amide hydrogen atom reacts with the sulfoxylates, water being in all probability split off during the reaction. Therefore, the products of the invention are best characterized by their process of manufacture. They may be designated as products obtained by condensing amides which contain at least two carbon atoms and at least one hydrogen atom connected with an amide nitrogen atom, and which are free from basic amino groups, with salts of aldehyde sulfoxylic acids at a raised temperature, which products are solid to liquid substances soluble in water and are decomposed by heating with strong mineral acids at raised temperatures.

By suitable selection of the parent materials used, the products of the present invention may be used as auxiliary products, for example, in the textile, leather or paper industries, or as agents for the combatting of pests. Thus, for example, the products obtained from parent materials of comparatively low molecular weight, for example, those obtained from nuclear alkylated sulfonic acid amides of the benzene series, are suitable for use as wetting agents for mercerizing liquors. Products of the invention which contain an aliphatic or cycloaliphatic radical of high molecular weight can be used, thanks to their surface activity, as wetting, washing, foaming, emulsifying, or softening agents and the like. The products of the present invention can be used either alone or in combination with other substances.

The following examples illustrate the invention, but are not to be regarded as limiting it in any way, the parts being by weight:

*Example 1*

10.6 parts of cymene sulfonic acid amide of the formula

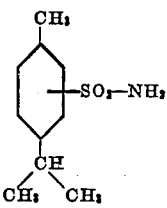

obtained by treatment of cymene with chlorsulfonic acid and conversion of the resulting cymene sulfonic acid chloride into the sulfamide by means of aqueous ammonia, are powdered and mixed with 8.5 parts of sodium formaldehyde sulfoxylate. The mixture is heated whilst stirring, the temperature of the heating bath being raised to 120° C. in about 20 minutes. After stirring a further 5 minutes or so in a bath at 115–120° C., the reaction product is soluble in water to a clear solution. After cooling, the new product is found to be a solid mass which dissolves in water to give a clear, foaming solution. The course of the reaction corresponds probably to the equation:

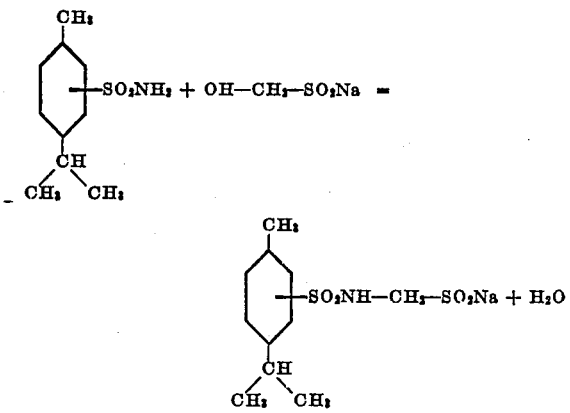

It can be used as a wetting agent for mercerizing lyes, in which case it is advisable to reduce its tendency to foam by addition of foam-preventing agents. A suitable mixture consists, for example, of

|  | Parts |
|---|---|
| The product described above | 20 |
| Diethylene glycol monobutyl ether | 10 |
| 2-ethylhexanol | 2 |
| Water | 68 |

A mixture composed of

|  | Parts |
|---|---|
| The product described above | 20 |
| Diethylene glycol monobutyl ether | 5 |
| Potassium oleate | 1.5 |
| Pine oil | 3.5 |
| Water | 70 | is also a suitable wetting agent for mercerizing liquors.

Instead of sodium formaldehyde sulfoxylate the sodium salt of acetaldehyde sulfoxylic acid may be used in the reaction with cymene sulfamide. In the same manner other amides such as toluene sulfamide, sulfamides of aliphatic hydrocarbons, for instance hexane sulfamide, may be condensed with the sodium salt of the formaldehyde sulfoxylic acid.

*Example 2*

A mixture of 4.4 parts of finely powdered N-stearoyl-paratoluene sulfonic acid amide, 2.3 parts of sodium formaldehyde sulfoxylate and 0.1 part of diamylamine is heated to about 145° C. for about an hour whilst stirring. After stirring for a further 1 hour in a bath at 145–147° C., the reaction product gives a clear solution in hot water. After cooling, the product is an almost colorless, solid mass, which dissolves in hot water to yield a clear, strongly foaming solution. The course of the reaction corresponds probably to the equation:

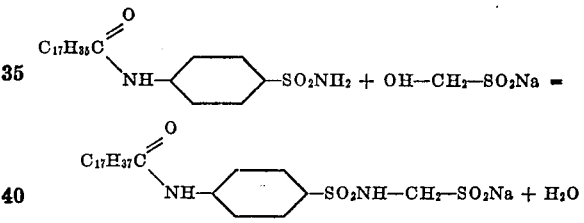

In a similar manner, the cymene sulfamide substituted in the amido group by the cocoanut fatty acid radical (obtained in the usual way from cymene sulfamide and cocoanut fatty acid chloride, for example, by heating to about 100° C.) may be reacted with sodium formaldehyde sulfoxylate. In this case, a viscous mass is obtained, which dissolves in hot water to yield an opalescent, strongly foaming solution.

*Example 3*

A mixture of 5.6 parts of oleic acid amide, 3.5 parts of sodium formaldehyde sulfoxylate and 0.2 part of diamylamine is heated with stirring, the temperature of the heating bath being raised first of all to 140° C. in about 1½ hours, then, in the course of about 2 hours, to 180° C. After stirring for a further 30 minutes or so in a bath at 180–185° C., the reaction mass is allowed to cool, whereupon it is triturated with acetone. The insoluble portion is separated by filtering with suction and is then freed from solvent. The new product is obtained as a solid mass, which is dissolved by water to give a clear, strongly foaming solution. It can be used, for example, as a washing agent. The course of the reaction corresponds probably to the following equation:

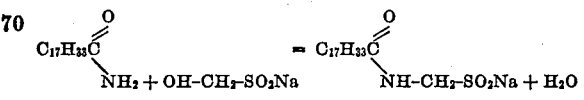

In a similar manner, technical stearic acid amide can be caused to react with sodium formaldehyde sulfoxylate in the presence of a little diamylamine. In this case, an almost colorless, solid mass is obtained, which dissolves in hot water to give a weakly opalescent, strongly foaming solution. Moreover, it is possible to substitute other amides, such as benzoic acid amide, acetic acid amide, N-methyl lauric acid amide for the amides used in the above described condensations.

Example 4

A mixture of 10 parts of cocoanut fatty acid amide, 11 parts of sodium formaldehyde sulfoxylate and 0.3 part of diamylamine is heated whilst stirring, the temperature of the heating bath being raised first of all to 140° C. in the course of about 1 hour and then, during a further hour, to 180° C. The reaction mixture is then stirred for a further 1 hour in a bath at 180–185° C., after which it is allowed to cool. The new product obtained in this manner is an almost colourless, solid mass, which is dissolved by water to give a strongly foaming solution. It can be used as a washing agent, especially as a hair wash. The course of the reaction corresponds probably to the following equation:

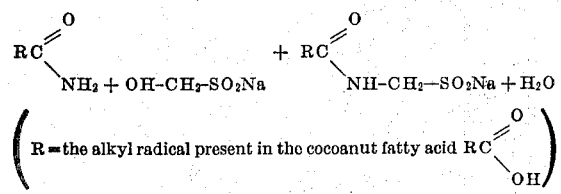

Example 5

3.6 parts of para-hydroxyphenyl-heptadecyl ketone (obtainable, for example, by rearrangement of stearic acid phenyl ester with aluminum chloride) are mixed with 2.3 parts of sodium formaldehyde sulfoxylate and 0.1 part of diamylamine, and the mixture is heated whilst stirring, the temperature of the heating bath being raised to 160° C. in 2 hours. Stirring is continued for a further 3 hours in a bath at 160–165° C., after which the reaction product is allowed to cool, when it is triturated with acetone and the insoluble portion is separated by filtering at the pump. After removal of the solvent, a solid, pulverisable mass is obtained which dissolves in hot water to give a weakly opalescent, strongly foaming solution.

What I claim is:

1. Process for the manufacture of a condensation product, which comprises condensing an amide selected from the group consisting of aliphatic and aromatic amides which amide contains at least two carbon atoms and at least one hydrogen atom connected with an amide nitrogen atom and is free from basic amino groups, with a salt of an aldehyde sulfoxylic acid at a temperature of 100–180° C.

2. Process for the manufacture of a condensation product, which comprises condensing an amide selected from the group consisting of aliphatic and aromatic amides which amide contains at least two carbon atoms and at least one hydrogen atom connected with an amide nitrogen atom and is free from basic amino groups, with a salt of formaldehyde sulfoxylic acid at a temperature of 100–180° C.

3. Process for the manufacture of a condensation product, which comprises condensing a sulfamide which contains at least two carbon atoms and at least one hydrogen atom connected with an amide nitrogen atom and is free from basic amino groups, with a salt of formaldehyde sulfoxylic acid at a temperature of 100–180° C.

4. Process for the manufacture of a condensation product, which comprises condensing a primary aromatic sulfamide which is free from basic amino groups, with a salt of formaldehyde sulfoxylic acid at a temperature of 100–180° C.

5. Process for the manufacture of a condensation product, which comprises condensing cymene sulfamide of the formula

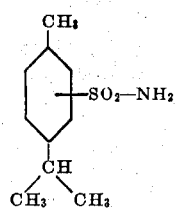

with a salt of formaldehyde sulfoxylic acid at a temperature of 100–180° C.

6. Process for the manufacture of a condensation product, which comprises condensing a carboxylic acid amide selected from the group consisting of aliphatic and aromatic amides which amide contains at least two carbon atoms and at least one hydrogen atom connected with an amide nitrogen atom and is free from basic amino groups, with a salt of formaldehyde sulfoxylic acid at a temperature of 100–180° C.

7. Process for the manufacture of a condensation product, which comprises condensing an aliphatic carboxylic acid amide which contain at least eight carbon atoms and at least one hydrogen atom connected with an amide nitrogen atom and is free from basic amino groups, with a salt of formaldehyde sulfoxylic acid at a temperature of 100–180° C.

8. Process for the manufacture of a condensation product, which comprises condensing a primary aliphatic carboxylic acid amide which contains at least eight carbon atoms and is free from basic amino groups, with a salt of formaldehyde sulfoxylic acid at a temperature of 100–180° C.

9. Process for the manufacture of a condensation product, which comprises condensing lauric acid amide with a salt of formaldehyde sulfoxylic acid at a temperature of 100–180° C.

10. Process for the manufacture of a condensation product, which comprises condensing oleic acid amide with a salt of formaldehyde sulfoxylic acid at a temperature of 100–180° C.

11. The product obtained by condensing an amide selected from the group consisting of aliphatic and aromatic amides, which amide contains at least two carbon atoms and at least one hydrogen atom connected with an amide nitrogen atom, and which is free from basic amino groups, with a salt of an aldehyde sulfoxylic acid at a temperature of 100–180° C., which product contains the group of the formula

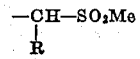

wherein Me represents a monovalent cation and R represents a hydrocarbon radical, bound to an amide nitrogen and is a solid to liquid substance soluble in water.

12. The produce obtained by condensing an amide selected from the group consisting of aliphatic and aromatic amides, which amide contains at least two carbon atoms and at least one hydrogen atom connected with an amide nitrogen atom, and which is free from basic amino groups, with a salt of formaldehyde sulfoxylic acid at a temperature of 100–180° C., which product contains the group of the formula —CH₂SO₂Me, wherein Me represents a monovalent cation, bound to an amide nitrogen and is a solid to liquid substance soluble in water.

13. The product obtained by condensing a sulfamide which contains at least two carbon atoms and at least one hydrogen atom connected with an amide nitrogen atom, and which is free from basic amino groups, with a salt of formaldehyde sulfoxylic acid at a temperature of 100–180° C., which product contains the group of the formula —CH₂SO₂Me, wherein Me represents a monovalent cation, bound to an amide nitrogen and is a solid to liquid substance soluble in water.

14. The product obtained by condensing a primary aromatic sulfamide which is free from basic amino groups, with a salt of formaldehyde sulfoxylic acid at a temperature of 100–180° C., which product contains the group of the formula —CH₂SO₂Me, wherein Me represents a monovalent cation, bound to an amide nitrogen and is a solid to liquid substance soluble in water.

15. The product obtained by condensing cymene sulfamide of the formula

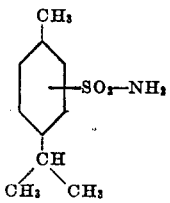

with a salt of formaldehyde sulfoxylic acid at a temperature of 100–180° C., which product contains the group of the formula —CH₂SO₂Me, wherein Me stands for a monovalent cation, bound to an amide nitrogen and is a solid substance soluble in water.

16. The product obtained by condensing a carboxylic acid amide selected from the group consisting of aliphatic and aromatic amides, which amide contains at least two carbon atoms and at least one hydrogen atom connected with an amide nitrogen atom, and which is free from basic amino groups, with a salt of formaldehyde sulfoxylic acid at a temperature of 100–180° C., which product contains the group of the formula —CH₂SO₂Me, wherein Me stands for a monovalent cation, bound to an amide nitrogen and is a solid to liquid substance soluble in water.

17. The product obtained by condensing an aliphatic carboxylic acid amide selected from the group consisting of aliphatic and aromatic amides, which amide contains at least eight carbon atoms and at least one hydrogen atom connected with an amide nitrogen atom, and which is free from basic amino groups, with a salt of formaldehyde sulfoxylic acid at a temperature of 100–180° C., which product contains the group of the formula —CH₂SO₂Me, wherein Me stands for a monovalent cation, bound to an amide nitrogen and is a solid to liquid substance soluble in water.

18. The product obtained by condensing a primary aliphatic carboxylic acid amide selected from the group consisting of aliphatic and aromatic amides, which amide contains at least eight carbon atoms and at least one hydrogen atom connected with an amide nitrogen atom, and which is free from basic amino groups, with a salt of formaldehyde sulfoxylic acid at a temperature of 100–180° C., which product contains the group of the formula —CH₂SO₂Me, wherein Me stands for a monovalent cation, bound to an amide nitrogen and is a capillary active solid to liquid substance soluble in water.

19. The product obtained by condensing lauric acid amide with a salt of formaldehyde sulfoxylic acid at a temperature of 100–180° C., which product contains the group of the formula —CH₂SO₂Me, wherein Me stands for a monovalent cation, bound to an amide nitrogen and is a capillary active solid substance soluble in water.

20. The product obtained by condensing oleic acid amide with a salt of formaldehyde sulfoxylic acid at a temperature of 100–180° C., which product contains the group of the formula —CH₂SO₂Me, wherein Me stands for a monovalent cation, bound to an amide nitrogen and is a capillary active solid to liquid substance soluble in water.

OTTO ALBRECHT.

REFERENCES CITED

The following references are of record in the file of this patent:

UNITED STATES PATENTS

| Number | Name | Date |
|---|---|---|
| 1,932,177 | Guenther et al. | Oct. 24, 1933 |
| 2,161,407 | Christiansen | June 6, 1939 |
| 2,213,695 | Yamashita | Mar. 9, 1943 |
| 2,229,127 | Raiziss et al. | Jan. 21, 1941 |
| 2,243,437 | Orthner et al. | May 27, 1941 |
| 2,280,856 | Rosenthal et al. | Apr. 28, 1942 |
| 2,309,248 | Kamlet | Jan. 26, 1943 |
| 2,338,106 | Foldi | Jan. 4, 1944 |

FOREIGN PATENTS

| Number | Country | Date |
|---|---|---|
| 470,462 | Great Britain | Aug. 11, 1937 |